United States Patent
Inoue

(10) Patent No.: US 6,536,776 B2
(45) Date of Patent: Mar. 25, 2003

(54) METAL LAMINATE GASKET WITH BORE RING AND ENGAGING MEMBERS THEREOF

(75) Inventor: Takashi Inoue, Tokyo (JP)

(73) Assignee: Ishikawa Gasket Co., Ltd., Tokyo (JP)

(*) Notice: Subject to any disclaimer, the term of this patent is extended or adjusted under 35 U.S.C. 154(b) by 0 days.

(21) Appl. No.: 09/969,602

(22) Filed: Oct. 4, 2001

(65) Prior Publication Data
US 2002/0050688 A1 May 2, 2002

(30) Foreign Application Priority Data
Oct. 11, 2000 (JP) .................................. 2000-311094

(51) Int. Cl.$^7$ ................................................ F02F 11/00
(52) U.S. Cl. ........................................ 277/598; 277/592
(58) Field of Search ................................. 277/598, 600, 277/601, 592, 609, 630

(56) References Cited

U.S. PATENT DOCUMENTS

| 3,957,275 A | * | 5/1976 | Belter et al. ................. 277/594 |
| 4,126,318 A | * | 11/1978 | Belter .......................... 277/598 |
| 4,535,999 A | * | 8/1985 | Locacius ..................... 277/596 |
| 4,620,710 A | * | 11/1986 | Lambert et al. ............. 277/598 |
| 4,648,607 A | * | 3/1987 | Yamada et al. ............. 277/598 |
| 4,783,087 A | * | 11/1988 | DeCore et al. ............. 277/598 |
| 4,976,225 A | * | 12/1990 | Stang et al. ............. 123/41.74 |
| 5,141,237 A | | 8/1992 | Yamada et al. |
| 5,232,228 A | * | 8/1993 | Miyaoh ....................... 277/313 |
| 5,931,475 A | * | 8/1999 | Yamada ....................... 277/591 |
| 5,957,463 A | | 9/1999 | Inamura |
| 6,027,124 A | * | 2/2000 | Ishida et al. ................. 277/594 |
| 6,062,573 A | * | 5/2000 | Budovec et al. ............ 277/598 |
| 6,347,801 B1 | * | 2/2002 | Nakamura .................. 277/593 |

FOREIGN PATENT DOCUMENTS

JP 2000-220746 8/2000

* cited by examiner

Primary Examiner—Anthony Knight
Assistant Examiner—Alison K. Pickard
(74) Attorney, Agent, or Firm—Kanesaka & Takeuchi

(57) ABSTRACT

A metal laminate gasket for an internal combustion engine is formed by a first metal plate having a first hole corresponding to a hole of the engine, and a bore ring and a second metal plate both being disposed under the first metal plate. The bore ring has a second hole corresponding to the first hole, and at least two first engaging members formed around an outer periphery thereof with a predetermined distance away from each other. The second metal plate includes a third hole having a size for receiving the outer periphery of the bore ring, and at least two second engaging members formed around an inner periphery thereof to engage the at least two first engaging members. The first and second engaging members are arranged such that the bore ring can be positioned and retained in the second metal plate in only one position even if the bore ring is positioned upside down.

6 Claims, 2 Drawing Sheets

METAL LAMINATE GASKET WITH BORE RING AND ENGAGING MEMBERS THEREOF

BACKGROUND OF THE INVENTION AND RELATED ART STATEMENT

The invention relates to a metal laminate gasket with a bore ring and engaging members thereof, to be disposed between a cylinder head and a cylinder block.

A metal laminate gasket having a bore ring around a hole to be sealed has been known and widely used. In this case, the bore ring is generally disposed inside a hole of a metal plate, and the bore ring and the metal plate are laminated with one or more metal plates to form the metal laminate gasket.

However, in the above metal gasket, in case the outer shape of the bore ring is formed symmetrically in some degree, when the bore ring is assembled with the metal plate, the bore ring may be assembled in a wrong assembly direction or upside down by mistake. In this case, once the bore ring is assembled incorrectly, it is difficult to confirm that the bore ring is assembled correctly or not.

In the metal laminate gasket, the assembly order of the metal plates of the gasket can be identified and checked by forming projections or holes to be aligned in a specific order, as disclosed in U.S. Pat. No. 5,141,237. Also, in a metal laminate gasket with a bore ring, the bore ring may have large width portions symmetrically arranged, which are located in depressions of a metal plate, such as disclosed in U.S. Pat. No. 5,957,463. Further, as means for identifying the thickness of a bore ring, the bore ring may have a projection with signs for identifying the thickness thereof, which is located in a specific position of the gasket, as disclosed in Japanese Patent Publication (KOKAI) No. 2000-220746.

However, there is no gasket having means for locating a bore ring in a specific position, which can be also checked after assembly.

Accordingly, one object of the invention is to provide a metal laminate gasket having a metal plate and a bore ring retained inside the metal plate, wherein the assembly direction of the bore ring with respect to the metal plate can be positioned easily without mistake.

Another object of the invention is to provide a metal laminate gasket as stated above, wherein the wrong assembly and non-assembly of the bore ring can be confirmed after assembly by utilizing the positioning structure of the bore ring to the metal plate.

Further objects and advantages of the invention will be apparent from the following description of the invention.

SUMMARY OF THE INVENTION

A metal laminate gasket of the invention is used for an internal combustion engine having a hole to be sealed. The gasket comprises a first metal plate extending substantially throughout an entire area to be sealed and having a first hole corresponding to the hole of the engine, a bore ring disposed under the first metal plate, and a second metal plate disposed under the first metal plate.

The bore ring has a second hole corresponding to the first hole and at least two first engaging members formed around an outer periphery thereof with a predetermined distance away from each other. The second metal plate includes a third hole having a size for receiving the outer periphery of the bore ring, and at least two second engaging members formed around an inner periphery thereof to engage the at least two first engaging member. The first and second engaging members are arranged such that the bore ring can be positioned and retained in the second metal plate in only one position even if the bore ring is positioned upside down.

The first engaging member is one of a projection and a dent, and the second engaging member is the other of the projection and the dent. The projection and dent may be made small to engage with each other.

The first metal plate may include an opening at a position where one set of the first and second engaging members are disposed, so that an engagement of the one set of the first and second engaging members is seen through the opening. Since the engagement of the first and second engaging members can be seen through the opening, the wrong assembly or non-assembly of the bore ring can be confirmed after assembly by utilizing the positioning structure of the bore ring to the metal plate.

The bore ring except for the at least two first engaging member may have a substantially non-circular shape. On the other hand, the bore ring except for the at least two first engaging members may have a symmetrical shape with respect to a predetermined plane. In any situations, the first and second engaging members are formed at non-symmetrical positions.

DETAILED DESCRIPTION OF PREFERRED EMBODIMENTS

Figure 1:
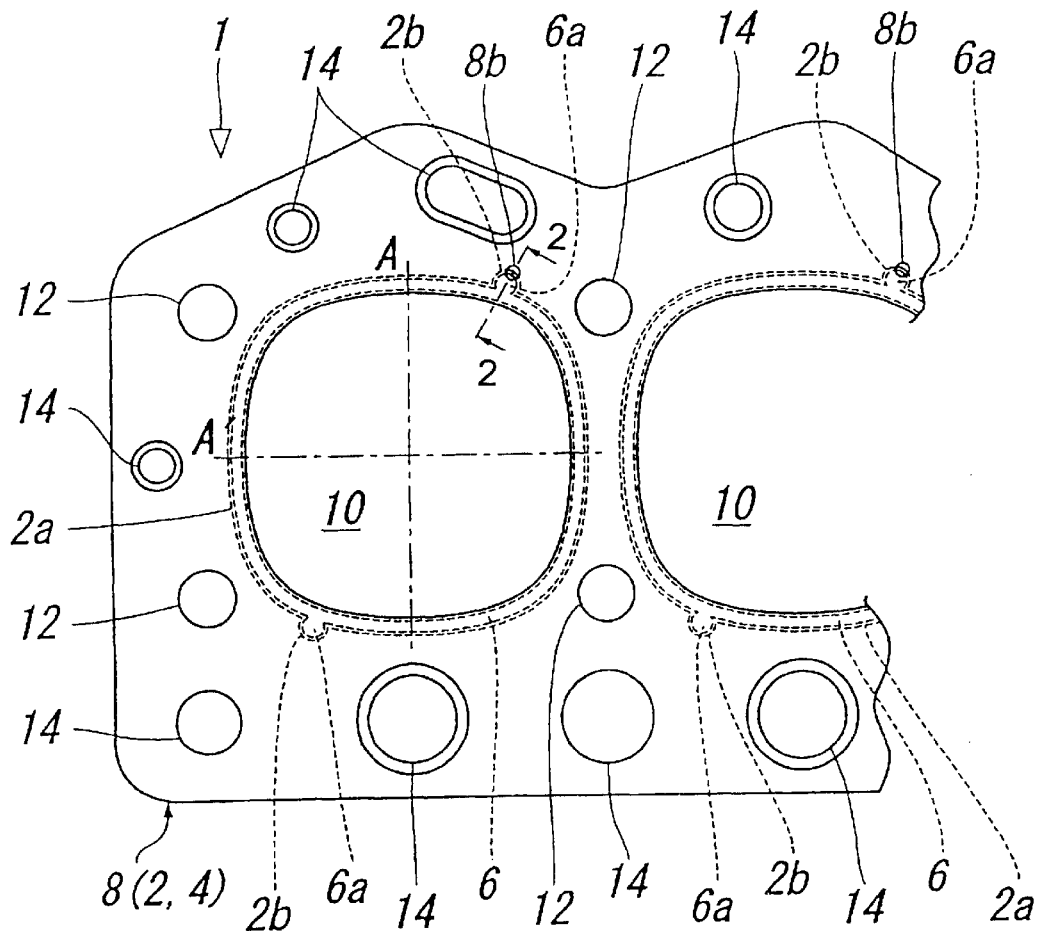
FIG. 1 is a partial plan view of a first embodiment of a metal laminate gasket of the invention.
Figure 2:
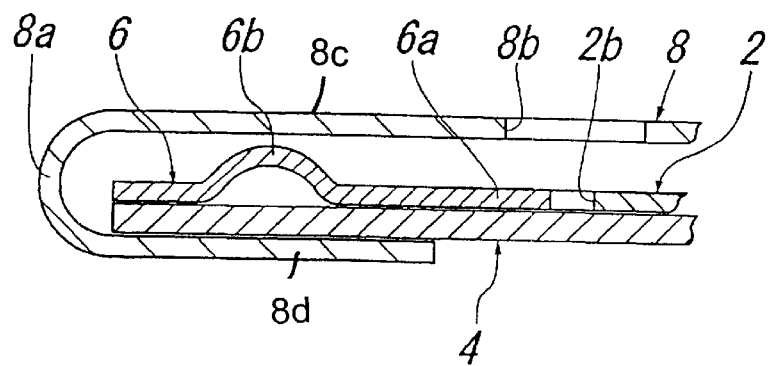
FIG. 2 is an enlarged sectional view taken along line 2—2 in FIG. 1.

Now, the invention will be explained with reference to the accompanying drawings. FIGS. 1 and 2 show a first embodiment of a cylinder head gasket to be mounted between a cylinder head and a cylinder block (both not shown).

The gasket 1 is designed to an engine having non-circular combustion chambers, and is formed by middle and lower (second and third) gasket plates 2, 4 laminated together, a bore ring 6 disposed inside an opening 2a of the middle gasket plate 2 above the lower gasket plate 4, and an upper (first) gasket plate 8. The upper gasket plate 8 includes a base portion 8c situated over the middle gasket plate 2 and the bore ring 6, a curved portion 8a for defining a hole 10 for a non-circular cylinder bore of the cylinder block, and a flange 8d disposed under the lower gasket plate 4. The gasket 1 also includes bolt holes 12 situated around the holes 10 for the cylinder bores for tightening the gasket between the cylinder block and the cylinder head, and liquid holes 14, such as water holes and oil holes.

As clearly shown in FIG. 1, the bore ring 6 has a shape similar to rectangle such that opposing sides relative to center lines A, A' are arranged symmetrically. The bore ring 6 is located inside the opening 2a of the middle gasket plate 2. In order to easily and accurately position the bore ring 6 to the middle gasket plate 2, the bore ring 6 has two projections 6a around the periphery thereof, and the middle gasket plate 2 includes two recesses 2b around the inner periphery thereof engaging the projections 6a of the bore ring 6.

As shown in FIG. 2, the bore ring 6 is located inside the curved portion 8a sandwiched between the base portion 8c and the flange 8d, and includes a bead 6b to increase the surface pressure around the hole 10. The bead 6b may not be formed necessarily. Incidentally, since the bore ring 6 is sandwiched between the lower gasket plate 4 and the base portion 8c of the upper gasket plate 8, when the gasket is assembled, the bore ring is not seen at all from the outside.

As stated above, since the outer shape of the bore ring 6 is symmetrical, in order to confirm that the bore ring 6 is correctly assembled with the gasket plate 2, the upper gasket plate 8 for covering the bore ring and the gasket plate 2 includes an opening 8b for watching the projection 6a of the bore ring 6 at a position above the projection 6a. In FIG. 1, although only one opening 8b is formed at a position corresponding to one portion among the two projections 6a, the opening may be formed at the other portion or both portions.

In the gasket as stated above, the projections 6a are formed at the outer periphery of the bore ring 6, and the recesses 2b for receiving the projections 6a are formed at the inner periphery of the opening 2a of the gasket plate 2. Since the projections 6a engage the recesses 2b, the bore ring 6 can be properly positioned. Therefore, when the outer periphery of the bore ring 6 is supported at the inner periphery of the opening 2a of the gasket plate 2, the assembly direction of the bore ring 6 is not made in a wrong way, and the bore ring 6 can be easily positioned correctly.

Also, in the invention, the opening 8b is formed in the upper gasket plate 8 at the position to be able to see the projection 6a of the bore ring 6. Therefore, it is possible to confirm the wrong assembly or non-assembly of the bore ring 6 by utilizing the structure for positioning the bore ring 6 to the first gasket plate 2.

Figure 3:
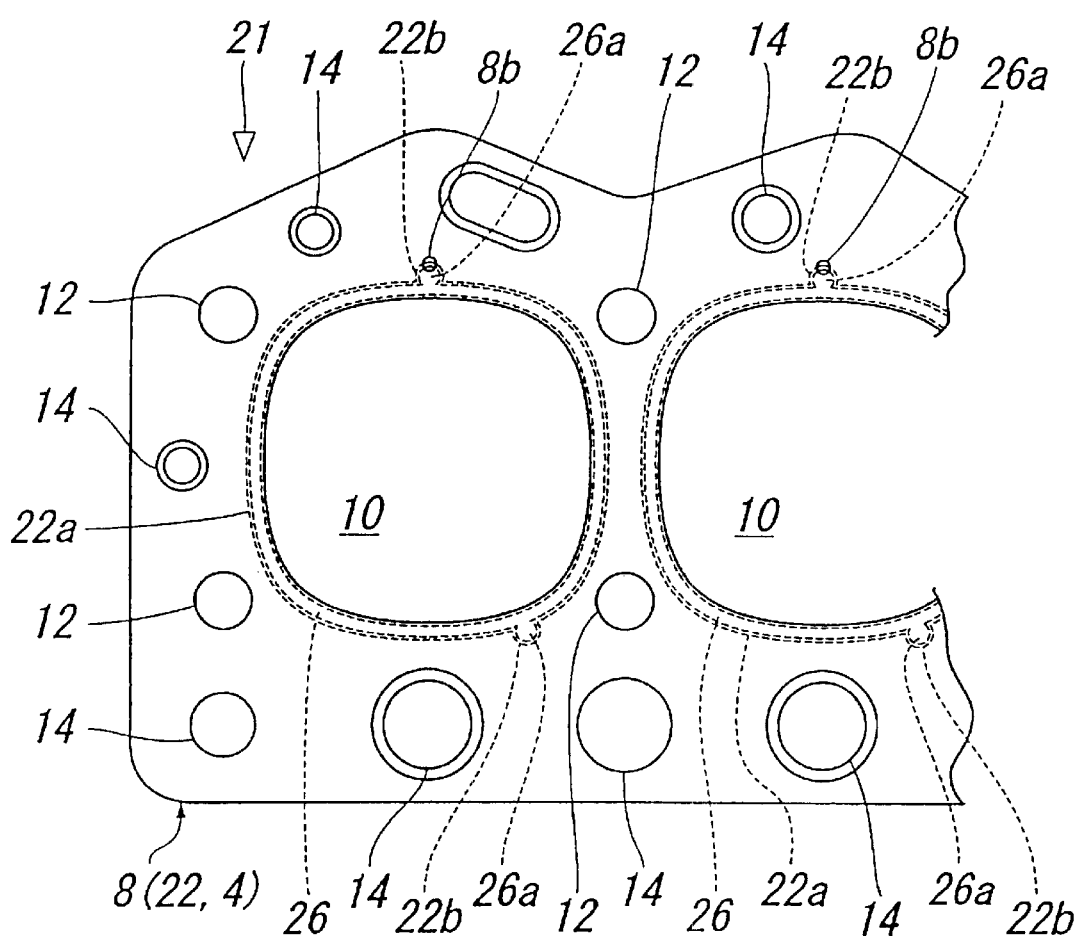
FIG. 3 is a partial plan view of a second embodiment of a metal laminate gasket of the invention.

FIG. 3 shows a second embodiment of a metal laminate gasket of the invention. The gasket 21 has a structure substantially the same as that of the first embodiment of the invention. However, the gasket 21 has a middle gasket plate 22 and a bore ring 26, instead of the middle gasket plate 2 and the bore ring 6, respectively. Since the other structure of the gasket 21 is the same as that of the gasket 1, the same or similar parts are assigned with the same or similar numerals.

In particular, the bore ring 26 has two projections 26a for positioning the bore ring 26 to the middle gasket plate 22 at the non-symmetrical positions on the outer periphery of the bore ring 26. Also, the middle gasket plate 22 has two recesses 22b at the inner periphery of a hole 22a thereof for engaging the projections 26a of the bore ring 26. Since the gasket is formed as stated above, even if the outer periphery of the bore ring is symmetrical relative to a desired plane passing through a center of the bore ring, the assembly direction of the bore ring 26 relative to the gasket plate 22 is not made incorrectly, and can be easily positioned.

In the above embodiments, the gasket is formed by three gasket plates laminated together, but the invention is not limited thereto, and it is possible to form the gasket with a plurality of metal plates, as desired. Also, the gasket may have a desired structure according to the engine to which the gasket is installed. For example, if necessary, a shim may be interposed between the plates, and a grommet is mounted around the hole for the cylinder bore.

As explained above, in accordance with the metal laminate gasket of the invention, in supporting the outer periphery of the bore ring at the inner periphery of the hole of the gasket plate, the bore ring can be easily positioned without positioning the assembly direction of the bore ring incorrectly.

Also, the opening for watching the projection is formed in the metal plate for holding the bore ring and the gasket plate with the recesses at the position corresponding to the projections. Thus, it is possible to confirm the wrong assembly or non-assembly of the bore ring by using the structure of positioning the bore ring to the gasket plate.

While the invention has been explained with reference to the specific embodiments of the invention, the explanation is illustrative, and the invention is limited only by the appended claims.

What is claimed is:

1. A metal laminate gasket for an internal combustion engine having a hole to be sealed, comprising:

a first metal plate extending substantially throughout an entire area to be sealed and having a first hole corresponding to the hole of the engine and an opening inside thereof, a bore ring disposed under the first metal plate, said bore ring having a second hole corresponding to the first hole and at least two first engaging members formed around an outer periphery thereof with a predetermined distance away from each other, and a second metal plate disposed under the first metal plate, said second metal plate including a third hole having a size for receiving the outer periphery of the bore ring, and at least two second engaging members formed around an inner periphery thereof to engage the at least two first engaging members, said first and second engaging members being arranged such that the bore ring can be positioned and retained in the second metal plate in only one position even if the bore ring is positioned upside down and one set of said first and second engaging members being located under the opening of the first metal plate so that an engagement of the one set of the first and second engaging members is seen through the opening.

2. A metal laminate gasket according to claim 1, wherein said first engaging member is one of a projection and a dent, and said second engaging member is the other of the projection and the dent.

3. A metal laminate gasket according to claim 2, wherein said bore ring except for the at least two first engaging members has a substantially non-circular shape.

4. A metal laminate gasket according to claim 2, wherein said bore ring except for the at least two first engaging members has a symmetrical shape with respect to a predetermined plane.

5. A metal laminate gasket according to claim 4, wherein said first and second engaging members are formed at non-symmetrical positions when the bore ring is disposed upside down with respect to the second metal plate.

6. A metal laminate gasket according to claim 2, further comprising a third metal plate disposed under the bore ring and the second metal plate so that the bore ring and the second metal plate are completely sandwiched between the first and third metal plates.

* * * * *